(12) United States Patent
Kou et al.

(10) Patent No.: US 12,122,608 B2
(45) Date of Patent: Oct. 22, 2024

(54) INSPECTION ROBOT SYSTEM

(71) Applicants: TAIYUAN UNIVERSITY OF TECHNOLOGY, Shanxi (CN); SHANXI DEDICATED MEASUREMENT CONTROL CO., LTD., Shanxi (CN); TAIYUAN BOSHITONG MACHINERY, ELECTRICITY AND HYDRAULIC ENGINEERING CO., LTD., Shanxi (CN)

(72) Inventors: Ziming Kou, Shanxi (CN); Juan Wu, Shanxi (CN); Shaoni Jiao, Shanxi (CN); Xin Li, Shanxi (CN); Wei Zhang, Shanxi (CN); Xinjie Fan, Shanxi (CN); Jiabao Xue, Shanxi (CN); Lijun Zhang, Shanxi (CN); Yongyong Dong, Shanxi (CN); Qingshan Niu, Shanxi (CN)

(73) Assignees: TAIYUAN UNIVERSITY OF TECHNOLOGY, Shanxi (CN); SHANXI DEDICATED MEASUREMENT CONTROL CO., LTD., Shanxi (CN); TAIYUAN BOSHITONG MACHINERY, ELECTRICITY AND HYDRAULIC ENGINEERING CO., LTD., Shanxi (CN)

( * ) Notice: Subject to any disclaimer, the term of this patent is extended or adjusted under 35 U.S.C. 154(b) by 0 days.

(21) Appl. No.: 18/282,797

(22) PCT Filed: Jun. 4, 2021

(86) PCT No.: PCT/CN2021/098443
§ 371 (c)(1),
(2) Date: Sep. 19, 2023

(87) PCT Pub. No.: WO2022/193446
PCT Pub. Date: Sep. 22, 2022

(65) Prior Publication Data
US 2024/0166449 A1    May 23, 2024

(30) Foreign Application Priority Data

Mar. 19, 2021  (CN) .......................... 202110296522.0

(51) Int. Cl.
*B65G 43/02*  (2006.01)
*B65G 17/20*  (2006.01)
(Continued)

(52) U.S. Cl.
CPC ............. *B65G 43/02* (2013.01); *B65G 17/20* (2013.01); *G05D 1/648* (2024.01); *B65G 2203/041* (2013.01); *G05D 2105/89* (2024.01)

(58) Field of Classification Search
CPC ........ B65G 17/20; B65G 43/00; B65G 43/02; B65G 43/06; G01D 1/648
(Continued)

(56) References Cited

U.S. PATENT DOCUMENTS 5,048,196 A * 9/1991 Bernd .................... B66C 13/46
33/744
5,351,621 A * 10/1994 Tanaka ................... B61B 13/04
105/154
(Continued)

FOREIGN PATENT DOCUMENTS

| CN | 106540390 | 3/2017 |
|---|---|---|
| CN | 208034689 | 11/2018 |

(Continued)

OTHER PUBLICATIONS

"International Search Report (Form PCT/ISA/210) of PCT/CN2021/098443", mailed on Dec. 2, 2021, with English translation thereof, pp. 1-6.

*Primary Examiner* — Douglas A Hess
(74) *Attorney, Agent, or Firm* — JCIPRNET

(57) ABSTRACT

An inspection robot system, including one or more detection devices, a rail, a traction device, one or more connecting devices, and a multi-axis manipulator. The detection devices are configured to at least obtain environmental image information. The rail is suspended in an air. The traction device includes a steel cable and a steel cable drive assembly. The steel cable drive assembly is connected to the steel cable and is configured to drive the steel cable to move along an axial (Continued)

direction of the steel cable. The connecting devices are slidably connected to the rail. The detection devices are respectively arranged on the connecting devices. The connecting devices are connected to the steel cable and are configured to move along the rail under a traction of the steel cable. At least one of the connecting devices is/are each provided with the multi-axis manipulator.

14 Claims, 3 Drawing Sheets

(51) Int. Cl.
 *G05D 1/648* (2024.01)
 *G05D 105/80* (2024.01)
(58) Field of Classification Search
 USPC .......................................... 198/502.1, 502, 4.4
 See application file for complete search history.

(56) References Cited

U.S. PATENT DOCUMENTS

| | | | | |
|---|---|---|---|---|
| 7,427,767 B2* | 9/2008 | Kemp | ............... | B65G 43/02 |
| | | | | 356/429 |
| 9,950,873 B2* | 4/2018 | Staab | ............... | B65G 43/02 |
| 9,988,217 B2* | 6/2018 | Hou | ............... | B65G 43/02 |
| 10,625,415 B2* | 4/2020 | Ooba | ............... | B25J 18/04 |
| 10,865,052 B2* | 12/2020 | Hou | ............... | B65G 43/02 |
| 11,866,267 B2* | 1/2024 | Dutta | ............... | B65G 43/02 |

FOREIGN PATENT DOCUMENTS

| | | |
|---|---|---|
| CN | 208043683 | 11/2018 |
| CN | 110744557 | 2/2020 |
| CN | 210175821 | 3/2020 |
| CN | 211278385 | 8/2020 |
| CN | 112009956 | 12/2020 |
| JP | H0216608 | 1/1990 |
| JP | H05333191 | 12/1993 |

* cited by examiner

INSPECTION ROBOT SYSTEM

CROSS-REFERENCE TO RELATED APPLICATION

This application is a 371 of international application of PCT application serial no. PCT/CN2021/098443, filed on Jun. 4, 2021 which claims the priority benefit of China application no. 202110296522.0, filed on Mar. 19, 2021. The entirety of each of the above mentioned patent applications is hereby incorporated by reference herein and made a part of this specification.

TECHNICAL FIELD

Embodiments of the present disclosure relate to the field of mining equipment, and particularly to an inspection robot system.

TECHNICAL BACKGROUND

An underground belt conveyor is important equipment in coal mine production, and the operating status of the underground belt conveyor directly affects the production efficiency of the coal mine.

The underground belt conveyor is prone to belt tearing, belt deviation, belt slipping, idler wear, and other problems during operation. Once a fault occurs during operation of the underground belt conveyor, the conveying efficiency of the coal mine is affected, or even the life safety of underground workers is endangered. Therefore, in the process of underground production, it is necessary to monitor the operating status of the underground belt conveyor for early fault warning.

At present, the inspection mode for the underground belt conveyor is mainly based on the combination of manual inspection and fixed-point camera monitoring. The manual inspection increases the labor costs of enterprises. In addition, the underground belt conveyor often is installed over a long distance, and is installed in a dark environment, generates loud noise during operation, and provides a narrow working position, making it difficult for an inspector to conduct a thorough inspection and easily causing the inspector to feel tired, thereby resulting in increased safety risks during production. Often, only some key areas can be monitored by the fixed-point camera monitoring, and the operation of the entire underground belt conveyor cannot be fully controlled, leading to serious safety hazards.

SUMMARY OF THE INVENTION

In view of the above, an objective of embodiments of the present disclosure is to provide an inspection robot system, in order to reduce the labor costs of enterprises and solve the problem that real-time and large-scale monitoring cannot be realized through manual inspection and fixed-point camera monitoring.

To achieve the above objective, the embodiments of the present disclosure provide an inspection robot system, including:
one or more detection devices, configured to at least obtain environmental image information;
a rail, suspended in an air;
a traction device, including a steel cable and a steel cable drive assembly, where the steel cable drive assembly is connected to the steel cable and is configured to drive the steel cable to move along an axial direction of the steel cable; and
one or more connecting devices, slidably connected to the rail, where the detection devices are respectively arranged on the connecting devices, and the connecting devices are connected to the steel cable and are configured to move along the rail under a traction of the steel cable; and
at least one of the connecting devices is/are each provided with a multi-axis manipulator, and the multi-axis manipulator is configured to carry a respective detection device of the detection devices to allow the respective detection device to move relative to the rail.

In some embodiments, the rail is in a shape of a closed circle, the steel cable drive assembly includes two traction disks and two disk drivers configured to drive the traction disks to rotate, and the steel cable is attached to circumferential arc-shaped surfaces of the two traction disks to form a closed circle.

In some embodiments, the connecting devices each include a rail holding assembly, a steel cable fixing assembly, a quick-connect fixing member, and a connecting rod, the rail holding assembly is arranged at a top end of the connecting rod, the rail holding assembly is in contact with the rail and is movable on the rail, the quick-connect fixing member is arranged at a bottom end of the connecting rod and is detachably connected to a respective one of the detection devices, the steel cable fixing assembly is arranged on the connecting rod between the rail holding assembly and the quick-connect fixing member, and the steel cable fixing assembly is connected to the steel cable.

In some embodiments, the inspection robot system includes a rail mounting rod, a bottom of the rail mounting rod is connected to a top of the rail to allow the rail to be suspended in the air, the rail is passed through the rail holding assembly, and the rail holding assembly is provided with an avoidance notch configured for avoiding the rail mounting rod during a movement.

In some embodiments, a cross-section of the rail perpendicular to an extending direction of the rail is circular, the rail holding assembly includes a rail holding clamp and a pulley arranged on the rail holding clamp, the pulley is attached to the rail and is configured to roll along the extending direction of the rail, the rail holding clamp is spaced apart from the rail along a radial direction of the rail, and the rail holding clamp surrounds a part of the rail along a circumferential direction of the rail.

In some embodiments, a plurality of pulleys are provided, a part of the plurality of pulleys are attached to an upper portion of the rail, and another part of the plurality of pulleys are attached to a lower portion of the rail.

In some embodiments, the steel cable fixing assembly includes a clamping plate, and the steel cable is sandwiched between the clamping plate and the connecting rod.

In some embodiments, the steel cable fixing assembly includes a rotating shaft and a torsion spring, the clamping plate is provided with a first mounting hole, the connecting rod is provided with a second mounting hole, the rotating shaft is passed through the first mounting hole and the second mounting hole, the clamping plate is rotatable about the rotating shaft, and the rotating shaft is passed through the torsion spring.

In some embodiments, the connecting rod is provided with a steel cable groove, and the clamping plate is provided with a limiting boss protruding toward the steel cable, and the limiting boss abuts against the steel cable to tightly press the steel cable in the steel cable groove.

In some embodiments, the detection devices each include a detection device body and a positioning plate, a quick-connect slot is defined by the detection device body and the positioning plate, a bottom side of the quick-connect slot is open, a part of a lower end portion of the positioning plate forms a positioning groove, the quick-connect fixing member includes an insert plate, a positioning bump, and a support plate, the support plate is arranged in a horizontal direction and connected to the connecting rod, the insert plate is arranged at an end of the support plate away from the connecting rod, the positioning bump protrudes from an upper surface of the support plate and is located between the connecting rod and the insert plate, the respective one of the detection devices is configured to be moved from top to bottom so that the insert plate is inserted into the quick-connect slot until the positioning bump is engaged into the positioning groove, and the upper surface of the support plate abuts against a lower surface of the positioning plate.

In some embodiments, the inspection robot system includes a wireless charging device, the wireless charging device includes a telescopic pile and a wireless charger configured to wirelessly charge the detection devices, the wireless charger is arranged on the telescopic pile, and the telescopic pile is configured to drive the wireless charger to move in a vertical direction.

In the embodiments of the present disclosure, the environmental image information obtained by the detection devices may be transmitted in real time to an external display or data processing device, for a user or the data processing device to analyze whether there are problems such as idler vibration, belt slipping, and belt tearing, so as to remotely determine whether there is an abnormality in the underground belt conveyor. In this way, real-time inspection by personnel on site is not required, thereby reducing the labor costs and avoiding potential safety hazards caused by long-term underground inspection operations of personnel. The steel cable directly pulls the detection devices through the connecting devices, so that the detection devices can move along the extending direction of the rail. Compared with the fixed-point camera monitoring, the constantly moving detection device has a wider detection range, and therefore can better detect the operating status of the underground belt conveyor.

In addition, the electric energy in the detection device only needs to be supplied to relevant detection equipment, and the connecting device does not need to be driven by the electric energy to move on the rail, thereby reducing the loss of the electric energy in the detection device and prolonging the service time of the detection device. The power for all the detection devices is from the steel cable. This avoids the problem of insufficient battery life when the detection device is self-powered and needs to detect the underground belt conveyor under complex working conditions such as long installation distance, a large number of uphill sections, and a large number of bends, and prevents an individual detection device from stopping on the rail due to power loss to affect the inspection of a subsequent detection device, and also avoids the cable entanglement due to the use of an external power cable for the detection device during movement, thereby improving the mobility of the detection device. In addition, this avoids the increase in weight and volume of the detection device caused by the arrangement of an additional driving mechanism and battery in the detection device, reducing the number of parts, reducing the workload of installation, debugging and maintenance, and reducing the requirements on the structural strength of the rail.

Furthermore, the detection devices, the rail, the traction device, the connecting devices, and the multi-axis manipulator are suspended in the air, to avoid the installation of the inspection robot system on the ground to interfere with the underground belt conveyor during movement, and prevent the inspection robot system from obstructing the personnel inspecting the underground belt conveyor. The connecting device moves on the rail and is supported by the rail, thereby suppressing the shaking of the connecting device caused by the running of the steel cable, providing a more stable operating environment for a camera arranged in the detection device, alleviating the problems such as inaccurate focusing of the camera otherwise caused by the constant change in the position of the detection device, and improving the accuracy of data collected by the detection device.

In the embodiments of the present disclosure, the multi-axis manipulator is combined with the detection device, to make use of the characteristics of multiple degrees of freedom and large moving radius of the multi-axis manipulator. The multi-axis manipulator can carry the detection device to move in a wide range and at multiple angles, so that after the detection device determines an approximate fault location of the underground belt conveyor, the multi-axis manipulator can move the detection device to the approximate fault location, thereby avoiding the problem that the detection device cannot perform fault discovery and diagnosis due to the long distance or the obstruction by other parts of the underground belt conveyor, and enabling the detection device to approach the fault location to collect more detailed data. Compared with the conventional method combining manual inspection and fixed-point camera monitoring, through the constant movement of the connecting device on the rail in the embodiments of the present disclosure, a more detailed inspection of the underground belt conveyor can be achieved, and the operating status of the underground belt conveyor can be monitored in real time and over a wide range, thereby improving the troubleshooting efficiency.

Figure 1:
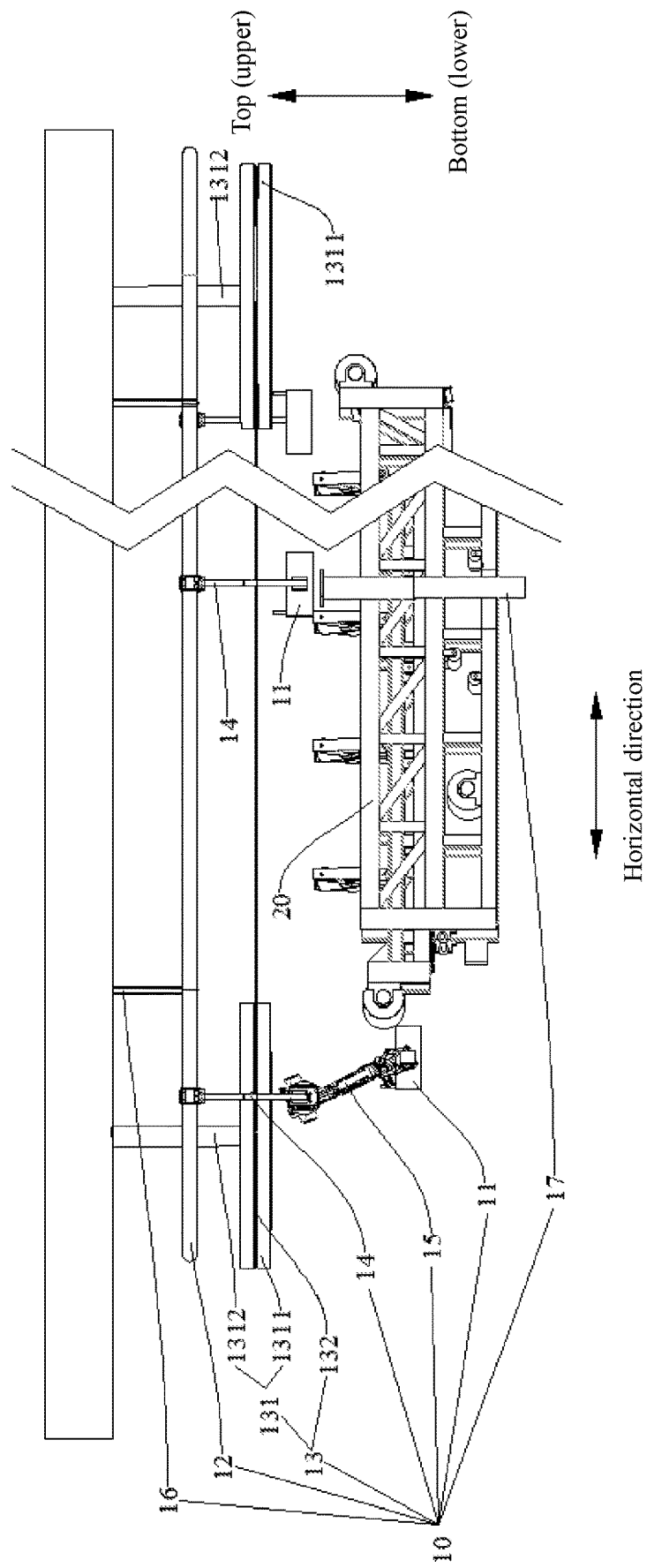
FIG. 1 is a schematic diagram of an inspection robot system according to an embodiment of the present disclosure.

LIST OF REFERENCE NUMERALS inspection robot system 10; detection device 11; detection device body 111; positioning plate 112; quick-connect slot 112a; positioning groove 112b; rail 12; traction device 13; steel cable drive assembly 131; traction disk 1311; disk driver 1312; steel cable 132; connecting device 14; rail holding assembly 141; avoidance notch 141a; rail holding clamp 1411; pulley 1412; steel cable fixing assembly 142; clamping plate 1421; rotating shaft 1422; torsion spring 1423; limiting boss 1424; quick-connect fixing member 143; support plate 1431; positioning bump 1432; insert plate 1433; connecting rod 144; steel cable groove 144a; multi-axis manipulator 15; rail mounting rod 16; wireless charging device 17; underground belt conveyor 20.

DETAILED DESCRIPTION OF THE EMBODIMENTS

It should be noted that the embodiments of the present disclosure and the technical features in the embodiments may be combined with each other without conflict. The detailed description herein shall be construed as an explanation of the spirit of the present disclosure and shall not be construed as unduly limiting the present disclosure.

In the description of the present disclosure, orientation or position relationships indicated by the terms such as "up", "down", "top", "bottom", and "horizontal direction" are based on orientation or position relationships shown in FIG. 1. It should be understood that such orientation terms are used only for ease and brevity of illustration and description, rather than indicating or implying that the mentioned apparatus or component need to have a particular orientation or need to be constructed and operated in a particular orientation. Therefore, such terms should not be construed as limiting of the present disclosure.

An embodiment of the present disclosure provides an inspection robot system 10. Referring to FIG. 1 to FIG. 5, the inspection robot system 10 includes one or more detection devices 11, a rail 12, a traction device 13, one or more connecting devices 14, and a multi-axis manipulator 15. The detection devices 11 are configured to at least obtain environmental image information. The rail 12 is suspended in an air. The traction device 13 includes a steel cable 132 and a steel cable drive assembly 131. The steel cable drive assembly 131 is connected to the steel cable 132 and is configured to drive the steel cable 132 to move along an axial direction of the steel cable 132. The connecting devices 14 are slidably connected to the rail 12. The detection devices 11 are respectively arranged on the connecting devices 14. The connecting devices 14 are connected to the steel cable 132 and are configured to move along the rail 12 under a traction of the steel cable 132. At least one of the connecting devices 14 is/are each provided with the multi-axis manipulator 15. The multi-axis manipulator 15 is configured to carry a respective detection device 11 of the detection devices 11 to allow the respective detection device 11 to move relative to the rail 12.

The environmental image information obtained by the detection devices 11 may be transmitted in real time to an external display or data processing device, for a user or the data processing device to analyze whether there are problems such as idler vibration, belt slipping, and belt tearing, so as to remotely determine whether there is an abnormality in the underground belt conveyor 20. In this way, real-time inspection by personnel on site is not required, thereby reducing the labor costs and avoiding potential safety hazards caused by long-term underground inspection operations of personnel.

The steel cable 132 directly pulls the detection devices 11 through the connecting devices 14, so that the detection devices 11 can move along the extending direction of the rail 12. Compared with the fixed-point camera monitoring, the constantly moving detection device 11 has a wider detection range, and therefore can better detect the operating status of the underground belt conveyor 20.

The electric energy in the detection device 11 only needs to be supplied to relevant detection equipment, and the connecting device 14 does not need to be driven by the electric energy to move on the rail 12, thereby reducing the loss of the electric energy in the detection device 11 and prolonging the service time of the detection device 11. The power for all the detection devices 11 is from the steel cable 132. This avoids the problem of insufficient battery life when the detection device 11 is self-powered and needs to detect the underground belt conveyor 20 under complex working conditions such as long installation distance, a large number of uphill sections, and a large number of bends, and prevents an individual detection device 11 from stopping on the rail 12 due to power loss to affect the inspection of a subsequent detection device 11, and also avoids the cable entanglement due to the use of an external power cable for the detection device 11 during movement, thereby improving the mobility of the detection device 11. In addition, this avoids the increase in weight and volume of the detection device 11 caused by the arrangement of an additional driving mechanism and battery in the detection device 11, reducing the number of parts, reducing the workload of installation, debugging and maintenance, and reducing the requirements on the structural strength of the rail 12.

The detection devices 11, the rail 12, the traction device 13, the connecting devices 14, and the multi-axis manipulator 15 are suspended in the air, to avoid the installation of the inspection robot system 10 on the ground to interfere with the underground belt conveyor 20 during movement, and prevent the inspection robot system 10 from obstructing the personnel inspecting the underground belt conveyor 20.

The connecting device 14 moves on the rail 12 and is supported by the rail 12, thereby suppressing the shaking of the connecting device 14 caused by the running of the steel cable 132, providing a more stable operating environment for a camera arranged in the detection device 11, alleviating the problems such as inaccurate focusing of the camera otherwise caused by the constant change in the position of the detection device 11, and improving the accuracy of data collected by the detection device 11.

In the embodiments of the present disclosure, the multi-axis manipulator 15 is combined with the detection device 11, to make use of the characteristics of multiple degrees of freedom and large moving radius of the multi-axis manipulator 15. The multi-axis manipulator 15 can carry the detection device 11 to move in a wide range and at multiple angles, so that after the detection device 11 determines an approximate fault location of the underground belt conveyor 20, the multi-axis manipulator 15 can move the detection device 11 to the approximate fault location, thereby avoiding the problem that the detection device 11 cannot perform fault discovery and diagnosis due to the long distance or the obstruction by other parts of the underground belt conveyor 20, and enabling the detection device 11 to approach the fault location to collect more detailed data. Compared with the conventional method combining manual inspection and fixed-point camera monitoring, through the constant movement of the connecting device 14 on the rail 12 in the embodiments of the present disclosure, a more detailed inspection of the underground belt conveyor 20 can be achieved, and the operating status of the underground belt conveyor 20 can be monitored in real time and over a wide range, thereby improving the troubleshooting efficiency.

On the connecting device 14 provided with the multi-axis manipulator 15, the detection device 11 may be directly fixed to the multi-axis manipulator 15. Alternatively, the detection device 11 may be removed from another position on the connecting device 14 by the multi-axis manipulator 15 as required.

Other sensors may be additionally arranged on the detection device 11 to obtain various environmental information data. For example, a thermal imaging camera may be arranged on the detection device 11 to monitor the generation of heat in various parts of the underground belt conveyor 20, especially in the moving structures, to predict a lubrication need or fault of the parts in advance according to abnormal heat generation. For another example, an air molecule detector may be arranged on the detection device 11 to analyze the content of toxic gases such as gas in underground air in real time, so as to improve the safety of underground operation. For another example, a sound collecting device such as a microphone may be arranged on the detection device 11 to determine whether abnormal sound exists during the operation of the underground belt conveyor 20, so as to determine whether a fault occurs in the underground belt conveyor 20.

It can be understood that a plurality of connecting devices 14 and a plurality of detection devices 11 may be provided, and the detection devices 11 and the connecting devices 14 are mounted in one-to-one correspondence and are constantly moved on the rail 12, thereby improving the speed of updating detection data, avoiding false positives and false negatives of operation problems of the underground belt conveyor 20 due to the fault of a single detection device 11, and improving the safety redundancy of the inspection robot system 10.

Each of the connecting devices 14 may be provided with a multi-axis manipulator 15 to facilitate the rapid detailed inspection of the fault location on the underground belt conveyor 20. Alternatively, only a part of the connecting devices 14 may be each provided with a multi-axis manipulator 15, and after the detection devices 11 on the remaining connecting devices 14 determine that a fault may occur and record a location of the fault, the connecting device 14 provided with the multi-axis manipulator 15 is moved to the location to perform detailed inspection.

An extending direction of the installation of the underground belt conveyor 20 matches the extending direction of a part of the rail 12, so that the connecting devices 14 can move in a range covering the entire installation range of the underground belt conveyor 20, and therefore can inspect all regions in the entire installation range.

Specifically, in some embodiments, the rail 12 is in a shape of a closed circle, the steel cable drive assembly 131 includes two traction disks 1311 and two disk drivers 1312 configured to drive the traction disks 1311 to rotate, and the steel cable 132 is attached to circumferential arc-shaped surfaces of the two traction disks 1311 to form a closed circle. The rail 12 and the steel cable 132 are arranged in the shape of circle, so that the connecting device 14 can always cyclically move along the rail 12 in the same direction, thereby expanding the detection range of an individual detection device 11. In addition, the plurality of detection devices 11 can provide backup for each other, and a position on the underground belt conveyor 20 can be scanned by all the detection devices 11, thereby reducing the probability of false positives or false negatives of faults of the inspection robot system 10.

The disk driver 1312 may include a motor and a speed reducer, or may include a permanent magnet motor as a driver for variable-frequency speed regulation, to adapt to the traction load of the steel cable 132 and the moving speed required by the detection device 11.

The disk driver 1312 may be suspended and fixed to the top of a mine tunnel or roadway, or may be suspended and fixed to a gantry support arranged in the mine tunnel or roadway.

It can be understood that a clamping groove (not shown) is provided along a circumferential direction of the traction disk 1311, and at least a part of the steel cable 132 is fitted in the clamping groove. On the one hand, the friction between the traction disk 1311 and the steel cable 132 is increased through the clamping groove, so as to prevent the slipping of the steel cable 132 during rolling of the traction disk 1311, and improve the transmission efficiency between the traction disk 1311 and the steel cable 132. On the other hand, the steel cable 132 is supported by a side wall of the clamping groove to prevent the steel cable 132 from falling due to gravity or shaking.

Figure 2:
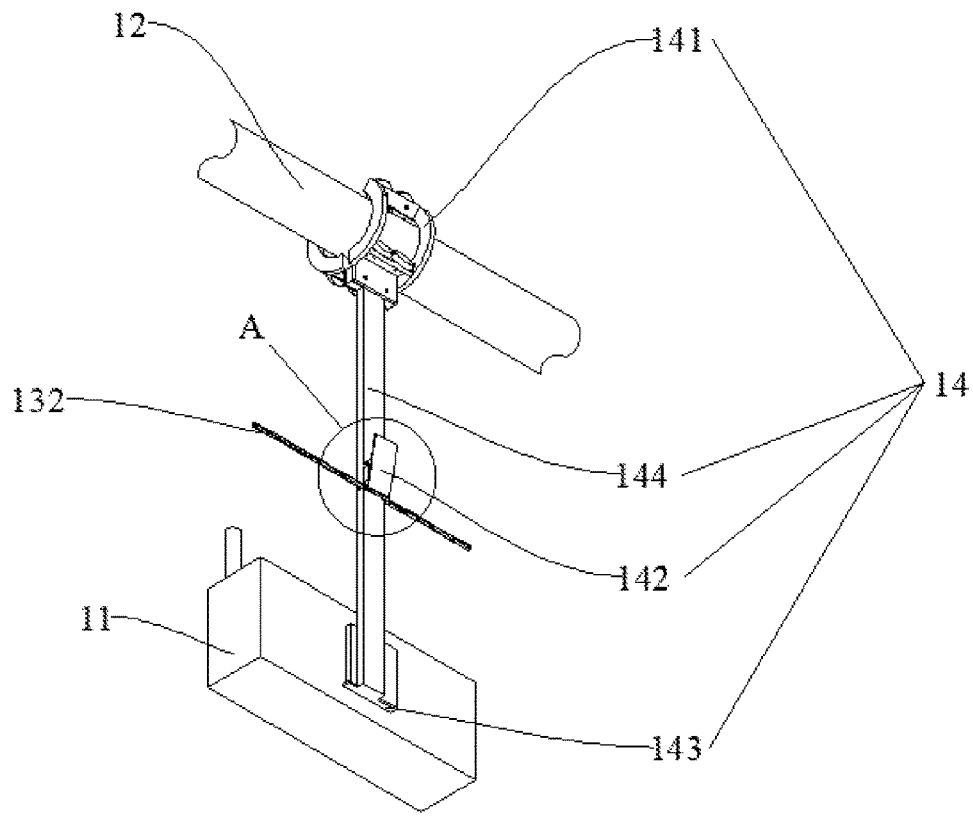
FIG. 2 is a schematic diagram showing connection between a steel cable, a rail, a connecting device, and a detection device according to an embodiment of the present disclosure.

In some embodiments, referring to FIG. 2, the connecting devices 14 each include a rail holding assembly 141, a steel cable fixing assembly 142, a quick-connect fixing member 143, and a connecting rod 144, the rail holding assembly 141 is arranged at a top end of the connecting rod 144, the rail holding assembly 141 is in contact with the rail 12 and is movable on the rail 12, the quick-connect fixing member 143 is arranged at a bottom end of the connecting rod 144 and is detachably connected to a respective one of the detection devices 11, the steel cable fixing assembly 142 is arranged on the connecting rod 144 between the rail holding assembly 141 and the quick-connect fixing member 143, and the steel cable fixing assembly 142 is connected to the steel cable 132. The rail holding assembly 141, the steel cable fixing assembly 142, and the quick-connect fixing member 143 are arranged at intervals in a vertical direction, and are respectively connected to the rail 12, the steel cable 132, and the respective one of the detection devices 11, to prevent mutual interference and facilitate installation by the user. In addition, the components of the connecting device 14, the rail 12, the steel cable 132, and the detection device 11 are arranged in the vertical direction, so that the projected area of the inspection robot system 10 in the vertical direction is reduced, thereby reducing the limitation of the width of the mine tunnel or roadway on the installation of the inspection robot system 10. Furthermore, the detection devices 11 are suspended at a lowermost position, to reduce the interference of other components of the inspection robot system 10 to the movement of the detection devices 11 and reduce the obstruction of the detection range of the detection devices 11.

Figure 3:
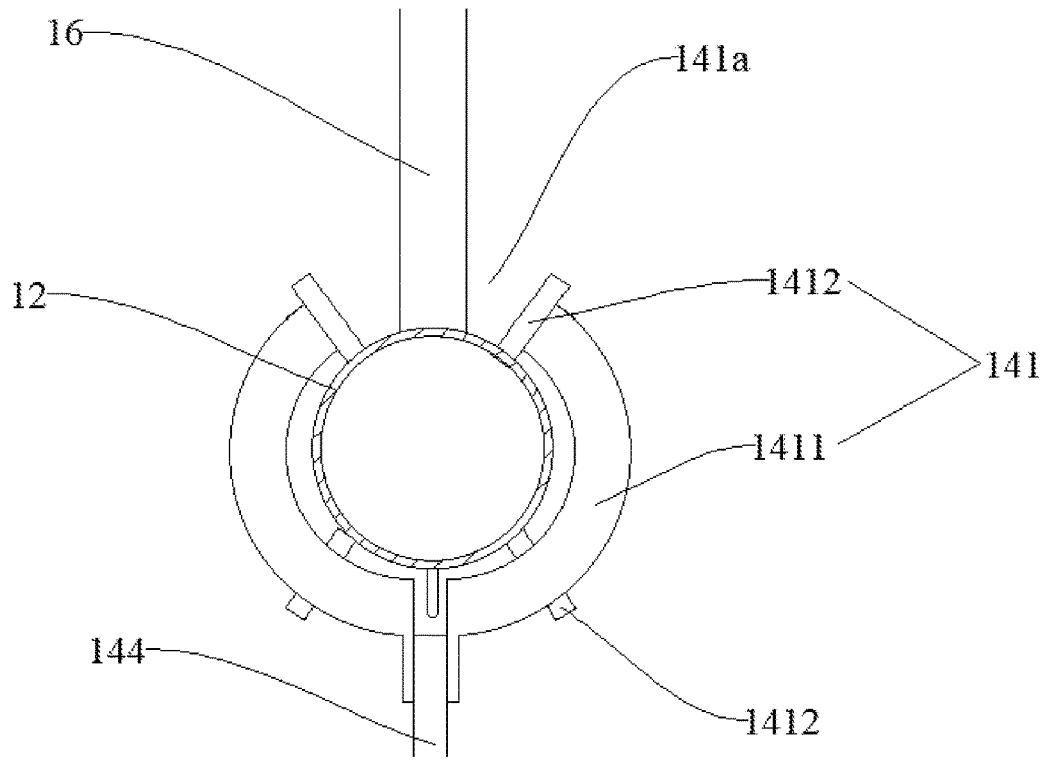
FIG. 3 is a schematic diagram showing connection between a rail holding assembly, a connecting rod, and a rail mounting rod according to an embodiment of the present disclosure.

In some embodiments, referring to FIG. 3, the inspection robot system 10 includes a rail mounting rod 16, a bottom of the rail mounting rod 16 is connected to a top of the rail 12 to allow the rail 12 to be suspended in the air, the rail 12 is passed through the rail holding assembly 141, and the rail holding assembly 141 is provided with an avoidance notch 141a configured for avoiding the rail mounting rod 16 during a movement. The rail 12 can be fixed in the air by the rail mounting rod 16, so that the connecting devices 14, the detection devices 11, and the multi-axis manipulator 15 can be suspended in the air. With the arrangement of the avoidance notch 141a, the connecting device 14 can continuously move on the rail 12.

A top of the rail mounting rod 16 may be fixed to the top of the mine tunnel or roadway, or may be fixed to a support or roof arranged in the mine tunnel or roadway.

In some embodiments, referring to FIG. 3, a cross-section of the rail 12 perpendicular to an extending direction of the rail 12 is circular, the rail holding assembly 141 includes a rail holding clamp 1411 and a pulley 1412 arranged on the rail holding clamp 1411, the pulley 1412 is attached to the rail 12 and is configured to roll along the extending direction of the rail 12, the rail holding clamp 1411 is spaced apart from the rail 12 along a radial direction of the rail 12, and the rail holding clamp 1411 surrounds a part of the rail 12 along a circumferential direction of the rail 12. The circular cross-section of the rail 12 can reduce the stress concentration caused when the rail 12 supports the connecting device 14, and reduce the damage to the surface of the rail 12 caused by the pressure exerted by the connecting device 14, and prolong the service life of the rail 12. The pulley 1412 reduces resistance to movement of the connecting device 14 on the rail 12, and reduces load and noise during operation of the steel cable drive assembly 131, and prolongs the service life of the steel cable 132. The rail holding clamp 1411 surrounding a part of the circular rail 12 reduces the probability of derailment of the rail holding assembly 141 during movement of the connecting device 14.

It can be understood that the rail 12 may be formed by standard-size circular steel tubes connected together. The use of the hollow steel tubes can reduce the structural weight of the rail 12. The standard-size circular steel tubes are readily commercially available, which is beneficial to reducing manufacturing costs.

In some embodiments, referring to FIG. 3, a plurality of pulleys 1412 are provided. The plurality of pulleys 1412 are attached to the rail 12, to reduce the pressure exerted by the connecting device 14 on the rail 12 and prolong the service life of the rail 12 and the pulleys 1412.

It can be understood that the plurality of pulleys 1412 may be arranged at intervals along the extending direction of the rail 12 or along the vertical direction.

The plurality of pulleys 1412 may be attached to the rail 12 from different directions to make the connection between the rail holding assembly 141 and the rail 12 more stable.

Specifically, in some embodiments, referring to FIG. 3, a part of the plurality of pulleys 1412 are attached to an upper portion of the rail 12, and another part of the plurality of pulleys 1412 are attached to a lower portion of the rail 12. The attachment of the plurality of pulleys 1412 to the upper portion and the lower portion of the rail 12 can suppress the gap formed between the pulleys 1412 and the rail 12 due to vibration in the vertical direction, to ensure that the pulleys 1412 are always attached to the rail 12.

Further, in some embodiments, referring to FIG. 3, the plurality of pulleys 1412 are arranged at equal intervals along the circumferential direction of the rail 12, and the pulleys 1412 are symmetrical with respect to a plane perpendicular to the cross-section of the rail 12 along the extending direction. By the above arrangement, the degree of freedom of the rail holding assembly 141 along the radial direction of the rail 12 is completely limited, so that the influence of vibration in all directions on the attachment of the pulleys 1412 to the rail 12 can be suppressed, thereby improving the stability of the rail holding assembly 141 during movement.

The steel cable fixing assembly 142 may be fixedly connected to the steel cable 132 or may be detachably connected to the steel cable 132.

Figure 4:
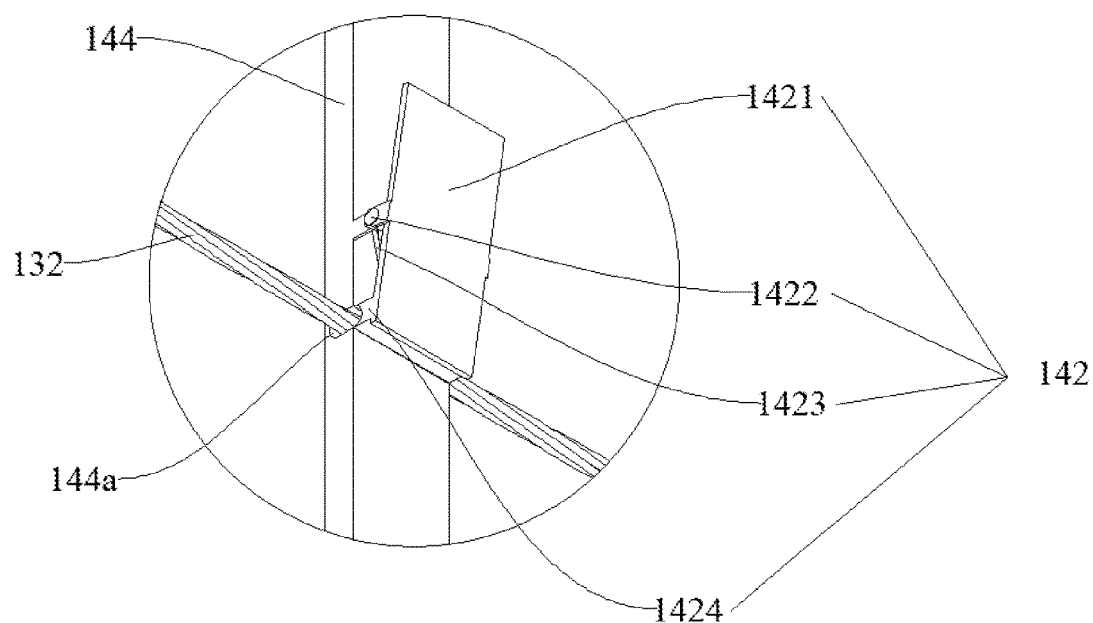
FIG. 4 is an enlarged schematic view of part A in FIG. 2.

For example, in some embodiments, referring to FIG. 4, the steel cable fixing assembly 142 includes a clamping plate 1421, and the steel cable 132 is sandwiched between the clamping plate 1421 and the connecting rod 144. By adjusting a clamping force between the clamping plate 1421 and the connecting rod 144, the connecting device 14 can be removed from the steel cable 132 to facilitate daily maintenance, and the connection position between the steel cable 132 and the steel cable fixing assembly 142 can be changed, so that the spacing between the connecting devices 14 can be adjusted according to actual situations.

The clamping plate 1421 and the connecting rod 144 may be connected by an adjusting screw (not shown), and a spacing between the clamping plate 1421 and the connecting rod 144 can be adjusted by rotating the adjusting screw, so that the clamping tightness can be changed.

In addition, a reset mechanism may be arranged between the clamping plate 1421 and the connecting rod 144 to enable quick assembly and disassembly between the clamping plate 1421 and the connecting rod 144.

For example, in some embodiments, referring to FIG. 4, the steel cable fixing assembly 142 includes a rotating shaft 1422 and a torsion spring 1423, the clamping plate 1421 is provided with a first mounting hole (not shown), the connecting rod 144 is provided with a second mounting hole (not shown), the rotating shaft 1422 is passed through the first mounting hole and the second mounting hole, the clamping plate 1421 is rotatable about the rotating shaft 1422, and the rotating shaft 1422 is passed through the torsion spring 1423. The steel cable 132 is stably clamped between the clamping plate 1421 and the connecting rod 144 by a torsion force generated by the torsion spring 1423. When the maintenance is required or the position of the connecting device 14 needs to be changed, the clamping plate 1421 is pushed to move away from the connecting rod 144, so that the connecting device 14 can be moved relative to the steel cable 132.

An auxiliary structure may be arranged on the clamping plate 1421 and the connecting rod 144 to make the clamping of the steel cable 132 more secure.

Specifically, in some embodiments, referring to FIG. 4, the connecting rod 144 is provided with a steel cable groove 144a, and the clamping plate 1421 is provided with a limiting boss 1424 protruding toward the steel cable 132, and the limiting boss 1424 abuts against the steel cable 132 to tightly press the steel cable 132 in the steel cable groove 144a. The friction between the steel cable 132 and the connecting rod 144 is increased by the steel cable groove 144a, so that the steel cable 132 is prevented from sliding on the connecting rod 144, thereby preventing the steel cable 132 from falling out between the clamping plate 1421 and the connecting rod 144.

A portion of the limiting boss 1424 abutting against the steel cable 132 may be designed to be conformal to an outer surface of the steel cable 132 to further increase the contact area and increase the friction force.

A quick-connect structure is adopted between the detection device 11 and the quick-connect fixing member 143, making it convenient for personnel to repair or for the multi-axis manipulator 15 to pick up and place.

Figure 5:
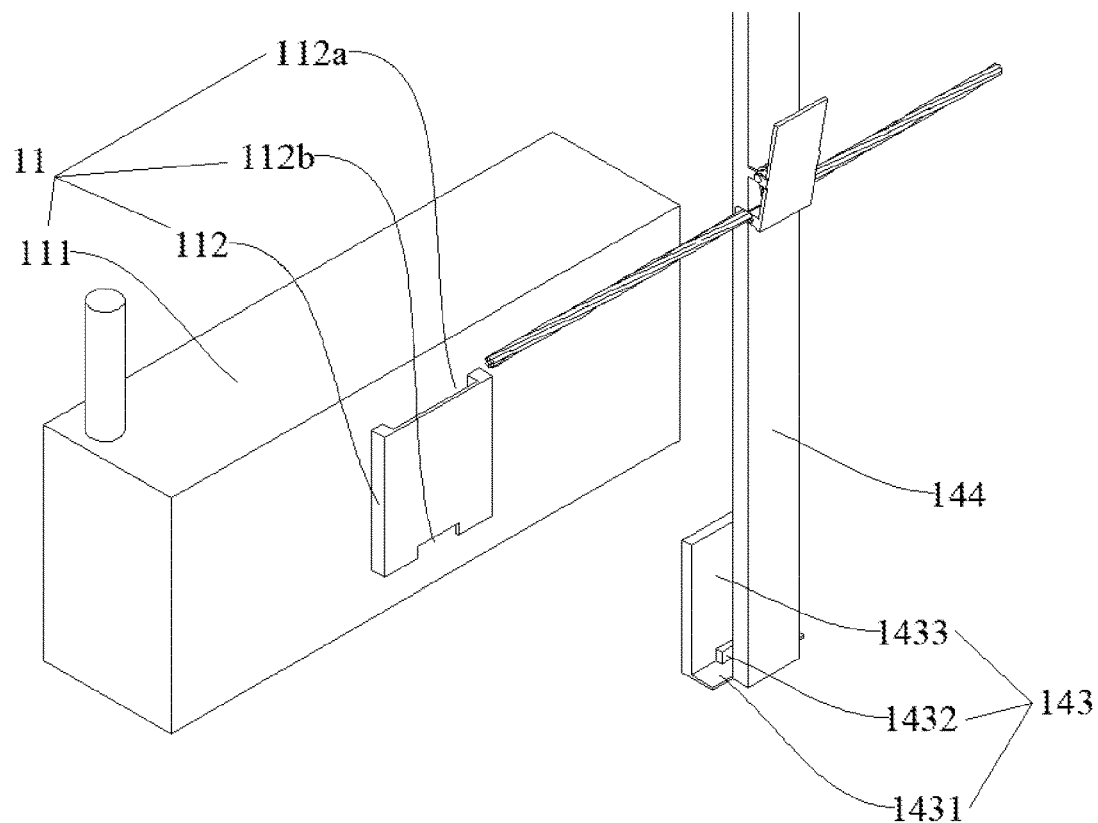
FIG. 5 is a schematic diagram of a detection device and a quick-connect fixing member according to an embodiment of the present disclosure.

For example, in some embodiments, referring to FIG. 5, the detection devices 11 each include a detection device body 111 and a positioning plate 112, a quick-connect slot 112a is defined by the detection device body 111 and the positioning plate 112, a bottom side of the quick-connect slot 112a is open, a part of a lower end portion of the positioning plate 112 forms a positioning groove 112b, the quick-connect fixing member 143 includes an insert plate 1433, a positioning bump 1432, and a support plate 1431, the support plate 1431 is arranged in a horizontal direction and connected to the connecting rod 144, the insert plate 1433 is arranged at an end of the support plate 1431 away from the connecting rod 144, the positioning bump 1432 protrudes from an upper surface of the support plate 1431 and is located between the connecting rod 144 and the insert plate 1433, the respective one of the detection devices 11 is configured to be moved from top to bottom so that the insert plate 1433 is inserted into the quick-connect slot 112*a* until the positioning bump 1432 is engaged into the positioning groove 112*b*, and the upper surface of the support plate 1431 abuts against a lower surface of the positioning plate 112. Because the upper surface of the support plate 1431 abuts against the lower surface of the positioning plate 112, the detection device 11 is supported in the vertical direction. A quick and stable connection between the detection device 11 and the quick-connect fixing member 143 is realized by the limiting effect of the insert plate 1433, the detection device body 111, and the positioning plate 112 and the positioning effect of the positioning bump 1432 and the positioning plate 112.

It can be understood that a gap tolerance between the insert plate 1433 and the positioning plate 112 as well as the detection device body 111 is relatively large to facilitate the insertion of the insert plate 1433 into the quick-connect slot 112*a*, and a gap tolerance between the positioning bump 1432 and the positioning groove 112*b* is relatively small to facilitate the installation and positioning of the detection device 11 and prevent shaking from affecting data collection.

The continuous operation duration of the detection device 11 may be prolonged by increasing the capacity of a battery in the detection device 11 or by using a fast charging method.

Specifically, in some embodiments, referring to FIG. 1, the inspection robot system 10 includes a wireless charging device 17, the wireless charging device 17 includes a telescopic pile (not shown) and a wireless charger (not shown) configured to wirelessly charge the detection devices 11, the wireless charger is arranged on the telescopic pile, and the telescopic pile is configured to drive the wireless charger to move in a vertical direction. When the detection device 11 has a low battery level, a charging request is sent to a control system of the inspection robot system 10 by radio frequency identification (RFID), near field communication (NFC), or other technologies. The control system controls the detection device 11 to move to the position above the wireless charging device 17, and controls the telescopic pile to stretch or retract, so that a distance between the wireless charger and the detection device 11 meets a requirement of wireless charging, and the wireless charger charges the detection device 11. With the arrangement of the telescopic pile to drive the wireless charger to move vertically, normally the wireless charger can be kept from the detection device 11 by a long distance, so as not to interfere with the movement and detection of the detection device 11. In this way, the detection device 11 can operate unremittingly for a long time.

The embodiments or implementations provided in the present disclosure may be combined with each other without conflict.

The above description is only preferred embodiments of the present disclosure, and is not intended to limit the present disclosure. To those having ordinary skill in the art, various modifications and variations may be made to the present disclosure. Any modifications, equivalent replacements, and improvements made within the spirit and principle of the present disclosure shall fall within the scope of the present disclosure.

INDUSTRIAL APPLICABILITY

Compared with the conventional method combining manual inspection and fixed-point camera monitoring, through the constant movement of the connecting device on the rail in the embodiments of the present disclosure, a more detailed inspection of the underground belt conveyor can be achieved, and the operating status of the underground belt conveyor can be monitored in real time and over a wide range, thereby improving the troubleshooting efficiency.

What is claimed is:

1. An inspection robot system, comprising
one or more detection devices, configured to at least obtain environmental image information;
a rail, suspended in an air;
a traction device, comprising a steel cable and a steel cable drive assembly, wherein the steel cable drive assembly is connected to the steel cable and is configured to drive the steel cable to move along an axial direction of the steel cable; and
one or more connecting devices, slidably connected to the rail, wherein the detection devices are respectively arranged on the connecting devices, and the connecting devices are connected to the steel cable and are configured to move along the rail under a traction of the steel cable;
and at least one of the connecting devices is/are each provided with a multi-axis manipulator, and the multi-axis manipulator is configured to carry a respective detection device of the detection devices to allow the respective detection device to move relative to the rail, wherein the rail is in a shape of a closed circle, the steel cable drive assembly comprises two traction disks and two disk drivers configured to drive the traction disks to rotate, and the steel cable is attached to circumferential arc-shaped surfaces of the two traction disks to form a closed circle.

2. The inspection robot system according to claim 1, wherein the connecting devices each comprise a rail holding assembly, a steel cable fixing assembly, a quick-connect fixing member, and a connecting rod, the rail holding assembly is arranged at a top end of the connecting rod, the rail holding assembly is in contact with the rail and is movable on the rail, the quick-connect fixing member is arranged at a bottom end of the connecting rod and is detachably connected to a respective one of the detection devices, the steel cable fixing assembly is arranged on the connecting rod between the rail holding assembly and the quick-connect fixing member, and the steel cable fixing assembly is connected to the steel cable.

3. The inspection robot system according to claim 2, wherein the inspection robot system comprises a rail mounting rod, a bottom of the rail mounting rod is connected to a top of the rail to allow the rail to be suspended in the air, the rail is passed through the rail holding assembly, and the rail holding assembly is provided with an avoidance notch configured for avoiding the rail mounting rod during a movement.

4. The inspection robot system according to claim 3, wherein a cross-section of the rail perpendicular to an extending direction of the rail is circular, the rail holding assembly comprises a rail holding clamp and a pulley arranged on the rail holding clamp, the pulley is attached to the rail and is configured to roll along the extending direction of the rail, the rail holding clamp is spaced apart from the rail along a radial direction of the rail, and the rail holding clamp surrounds a part of the rail along a circumferential direction of the rail.

5. The inspection robot system according to claim 4, wherein a plurality of pulleys are provided, a part of the plurality of pulleys are attached to an upper portion of the rail, and another part of the plurality of pulleys are attached to a lower portion of the rail.

6. The inspection robot system according to claim 2, wherein the steel cable fixing assembly comprises a clamping plate, and the steel cable is sandwiched between the clamping plate and the connecting rod.

7. The inspection robot system according to claim 6, wherein the steel cable fixing assembly comprises a rotating shaft and a torsion spring, the clamping plate is provided with a first mounting hole, the connecting rod is provided with a second mounting hole, the rotating shaft is passed through the first mounting hole and the second mounting hole, the clamping plate is rotatable about the rotating shaft, and the rotating shaft is passed through the torsion spring.

8. The inspection robot system according to claim 6, wherein the connecting rod is provided with a steel cable groove, and the clamping plate is provided with a limiting boss protruding toward the steel cable, and the limiting boss abuts against the steel cable to tightly press the steel cable in the steel cable groove.

9. The inspection robot system according to claim 2, wherein the detection devices each comprise a detection device body and a positioning plate, a quick-connect slot is defined by the detection device body and the positioning plate, a bottom side of the quick-connect slot is open, a part of a lower end portion of the positioning plate forms a positioning groove, the quick-connect fixing member comprises an insert plate, a positioning bump, and a support plate, the support plate is arranged in a horizontal direction and connected to the connecting rod, the insert plate is arranged at an end of the support plate away from the connecting rod, the positioning bump protrudes from an upper surface of the support plate and is located between the connecting rod and the insert plate, the respective one of the detection devices is configured to be moved from top to bottom so that the insert plate is inserted into the quick-connect slot until the positioning bump is engaged into the positioning groove, and the upper surface of the support plate abuts against a lower surface of the positioning plate.

10. The inspection robot system according to claim 1, wherein the inspection robot system comprises a wireless charging device, the wireless charging device comprises a telescopic pile and a wireless charger configured to wirelessly charge the detection devices, the wireless charger is arranged on the telescopic pile, and the telescopic pile is configured to drive the wireless charger to move in a vertical direction.

11. An inspection robot system, comprising
one or more detection devices, configured to at least obtain environmental image information;
a rail, suspended in an air;
a traction device, comprising a steel cable and a steel cable drive assembly, wherein the steel cable drive assembly is connected to the steel cable and is configured to drive the steel cable to move along an axial direction of the steel cable; and
one or more connecting devices, slidably connected to the rail, wherein the detection devices are respectively arranged on the connecting devices, and the connecting devices are connected to the steel cable and are configured to move along the rail under a traction of the steel cable;
and at least one of the connecting devices is/are each provided with a multi-axis manipulator, and the multi-axis manipulator is configured to carry a respective detection device of the detection devices to allow the respective detection device to move relative to the rail, wherein the connecting devices each comprise a rail holding assembly, a steel cable fixing assembly, a quick-connect fixing member, and a connecting rod, the rail holding assembly is arranged at a top end of the connecting rod, the rail holding assembly is in contact with the rail and is movable on the rail, the quick-connect fixing member is arranged at a bottom end of the connecting rod and is detachably connected to a respective one of the detection devices, the steel cable fixing assembly is arranged on the connecting rod between the rail holding assembly and the quick-connect fixing member, and the steel cable fixing assembly is connected to the steel cable, wherein the inspection robot system comprises a rail mounting rod, a bottom of the rail mounting rod is connected to a top of the rail to allow the rail to be suspended in the air, the rail is passed through the rail holding assembly, and the rail holding assembly is provided with an avoidance notch configured for avoiding the rail mounting rod during a movement.

12. The inspection robot system according to claim 11, wherein a cross-section of the rail perpendicular to an extending direction of the rail is circular, the rail holding assembly comprises a rail holding clamp and a pulley arranged on the rail holding clamp, the pulley is attached to the rail and is configured to roll along the extending direction of the rail, the rail holding clamp is spaced apart from the rail along a radial direction of the rail, and the rail holding clamp surrounds a part of the rail along a circumferential direction of the rail.

13. The inspection robot system according to claim 12, wherein a plurality of pulleys are provided, a part of the plurality of pulleys are attached to an upper portion of the rail, and another part of the plurality of pulleys are attached to a lower portion of the rail.

14. An inspection robot system, comprising
one or more detection devices, configured to at least obtain environmental image information;
a rail, suspended in an air;
a traction device, comprising a steel cable and a steel cable drive assembly, wherein the steel cable drive assembly is connected to the steel cable and is configured to drive the steel cable to move along an axial direction of the steel cable; and
one or more connecting devices, slidably connected to the rail, wherein the detection devices are respectively arranged on the connecting devices, and the connecting devices are connected to the steel cable and are configured to move along the rail under a traction of the steel cable;
and at least one of the connecting devices is/are each provided with a multi-axis manipulator, and the multi-axis manipulator is configured to carry a respective detection device of the detection devices to allow the respective detection device to move relative to the rail, wherein the inspection robot system comprises a wireless charging device, the wireless charging device comprises a telescopic pile and a wireless charger configured to wirelessly charge the detection devices, the wireless charger is arranged on the telescopic pile, and the telescopic pile is configured to drive the wireless charger to move in a vertical direction.

* * * * *